US 12,044,209 B2

(12) United States Patent
Rosander (10) Patent No.: US 12,044,209 B2
(45) Date of Patent: Jul. 23, 2024

(54) VERTICAL AXIS WIND TURBINE AND METHOD OF JOINING BLADE AND STRUT

(71) Applicant: SeaTwirl AB, Gothenburg (SE)

(72) Inventor: Martin Rosander, Mölndal (SE)

(73) Assignee: SEATWIRL AB, Gothenburg (SE)

( * ) Notice: Subject to any disclaimer, the term of this patent is extended or adjusted under 35 U.S.C. 154(b) by 0 days.

(21) Appl. No.: 18/246,890

(22) PCT Filed: Oct. 14, 2021

(86) PCT No.: PCT/SE2021/051013
§ 371 (c)(1),
(2) Date: Mar. 28, 2023

(87) PCT Pub. No.: WO2022/086394
PCT Pub. Date: Apr. 28, 2022

(65) Prior Publication Data
US 2023/0366375 A1    Nov. 16, 2023

(30) Foreign Application Priority Data

Oct. 19, 2020    (SE) .................................... 2051212-5

(51) Int. Cl.
*F03D 3/06*        (2006.01)
*F03D 1/06*        (2006.01)
(Continued)

(52) U.S. Cl.
CPC ........... *F03D 3/064* (2013.01); *F03D 1/0658* (2013.01); *F03D 3/005* (2013.01); *F16B 5/0275* (2013.01);
(Continued)

(58) Field of Classification Search
CPC ........ F03D 3/064; F03D 1/0658; F03D 3/005; F05B 2230/60; F05B 2240/211
See application file for complete search history.

(56) References Cited

U.S. PATENT DOCUMENTS

| | | | | |
|---|---|---|---|---|
| 148,927 A | * | 3/1874 | Chapin | .................... B63H 1/30 416/83 |
| 4,130,380 A | * | 12/1978 | Kaiser | .................... F03D 3/062 416/197 A |
| 4,566,854 A | | 1/1986 | Slezak | |
| 2010/0172759 A1 | | 7/2010 | Sullivan | |

(Continued)

FOREIGN PATENT DOCUMENTS

| | | |
|---|---|---|
| CN | 202055997 U | 11/2011 |
| CN | 113357077 A * | 9/2021 |

(Continued)

OTHER PUBLICATIONS

International Search Report and Written Opinion from International Application No. PCT/SE2021/051013, dated Dec. 2, 2021.

(Continued)

*Primary Examiner* — Brian Christopher Delrue
(74) *Attorney, Agent, or Firm* — Westman, Champlin & Koehler, P.A.

(57) ABSTRACT

A vertical axis wind turbine, comprising: a wind turbine body; a blade; and a strut having a first end coupled to the wind turbine body and a second end coupled to the blade using a fastening arrangement, wherein the fastening arrangement comprises a pliable fastening member pulling the blade towards the second end of the strut.

8 Claims, 8 Drawing Sheets

(51) Int. Cl.
    *F03D 3/00*         (2006.01)
    *F16B 5/02*         (2006.01)

(52) U.S. Cl.
    CPC ..... *F05B 2230/60* (2013.01); *F05B 2240/211* (2013.01)

(56) References Cited

U.S. PATENT DOCUMENTS

| | | | |
|---|---|---|---|
| 2011/0150652 A1* | 6/2011 | Cosby | F03D 3/064 29/889 |
| 2011/0311364 A1* | 12/2011 | Conner | F03D 3/061 416/243 |
| 2019/0153997 A1 | 5/2019 | Voegeli et al. | |
| 2019/0153998 A1* | 5/2019 | Fracaroli | F03D 3/068 |

FOREIGN PATENT DOCUMENTS

| | | | | |
|---|---|---|---|---|
| DE | 3825241 A1 * | 10/1989 | | F03D 3/005 |
| DE | 102015012081 A1 * | 3/2017 | | |
| DE | 102015012083 A1 * | 3/2017 | | |
| DE | 102015012084 A1 * | 3/2017 | | |
| DE | 102015012086 A1 * | 3/2017 | | |
| DE | 102017006360 A1 * | 1/2019 | | |
| DE | 102020007543 B3 * | 3/2022 | | |
| FR | 2975138 A1 * | 11/2012 | | F03D 3/005 |
| FR | 3007804 A1 * | 1/2015 | | F03B 13/22 |
| GB | 2461753 A * | 1/2010 | | F03D 1/0608 |
| JP | 2011080374 A * | 4/2011 | | |
| KR | 20140131850 A * | 11/2014 | | F03B 17/065 |
| WO | WO 03/044362 | 5/2003 | | |
| WO | 2008141763 A2 | 11/2008 | | |
| WO | 2012032038 A1 | 3/2012 | | |
| WO | WO-2022086394 A1 * | 4/2022 | | |

OTHER PUBLICATIONS

Extended European Search Report from European Application No. 21883404.2, dated Oct. 25, 2023.

* cited by examiner

VERTICAL AXIS WIND TURBINE AND METHOD OF JOINING BLADE AND STRUT

CROSS-REFERENCE TO RELATED APPLICATION

This Application is a Section 371 National Stage Application of International Application No. PCT/SE2021/051013, filed Oct. 14, 2021, and published as WO 2022/086394 A1 on Apr. 28, 2022, in English, which claims priority to Swedish Application No. 2051212-5, dated Oct. 19, 2020, the contents of which are hereby incorporated by reference in their entireties.

FIELD OF THE INVENTION

The present invention relates to a vertical axis wind turbine (VAWT) and to a method of joining a blade and a strut of a VAWT.

BACKGROUND OF THE INVENTION

The vertical axis wind turbine (VAWT) exists in many variants, the "Darrieus" type is characterized by its curved blades attached to the central rotating axis, whereas the "H-type" utilizes separate struts and blades. The struts hold the blades at a distance from the central axis. Each VAWT-type has its advantages and disadvantages, one disadvantage with the "H-type" is the connection required between blade and strut. This connection is often at a relatively straight angle, to keep down aerodynamic drag the available volume or area to transfer loads between blades and struts is relatively limited. At the same time the connection is in the outermost part of the rotating turbine, subject to high centrifugal forces.

Further requirements on the blade-to-strut connection is that it should be easy to install and de-install when assembling the complete turbine, and that the connection should not be expensive, in order for the VAWT to compete successfully with the horizontal axis wind turbine (HAWT), which do not require any struts.

Current solutions to this design problem typically utilize some variant of metallic fastener (bolts and nuts) to solve this mechanical problem. Since the blade-to-strut connection is subject to high fatigue loading (loads are varying as the VAWT rotates), the resulting bolted design often requires a significant number of bolts—a both heavy and expensive solution.

It would thus be desirable to provide an improved VAWT, in particular a VAWT with a blade-to-strut connection with improved properties.

SUMMARY

In view of the above-mentioned and other drawbacks of the prior art, it is an object of the present invention to provide an improved VAWT, having an improved blade-to-strut connection.

According to a first aspect of the present invention, it is therefore provided a vertical axis wind turbine, comprising a wind turbine body; a blade; and a strut having a first end coupled to the wind turbine body and a second end coupled to the blade using a fastening arrangement, wherein the fastening arrangement comprises a pliable fastening member pulling the blade towards the second end of the strut.

That the pliable fastening member is "pulling" the blade towards the second end of the strut should be understood to mean that the pliable fastening member is arranged in such a way that tensile forces in the pliable fastening member give rise to contact forces at the interface between the blade and the strut.

The present invention is based on the realization that a blade-to-strut connection using a pliable fastening member can be made lighter and less prone to fatigue failure than a conventional bolted connection. Furthermore, disassembly of the blade-to-strut connection can be facilitated, which may simplify the procedure of assembling the complete wind turbine. This may be of particular importance for vertical axis wind turbines for offshore deployment, which may be very large, such as more than 5500 meters in diameter.

In addition, the use of a pliable fastening member may enable the design of a fastening arrangement in which the load on the blade can be distributed across a relatively large area, as compared to a bolted connection. This may be particularly advantageous for vertical axis wind turbines in which the blades are made of composite materials, since such blades may exhibit a desired combination of low weight and high strength, but be relatively sensitive to point loads.

In various embodiments, the pliable fastening member may be at least partly made of textile material. In a textile material, fibers, wires, strands or bands are combined by textile-forming techniques such as weaving, braiding, or knitting etc. Thereby, the pliable fastening member can be provided with desired properties through a suitable combination of fiber material and/or configuration, and textile forming technique(s). It is known from, for example, the use of textiles in mooring systems or in sailing etc, that a mechanical connection using a textile-based fastening member can be made more light-weight and less prone to failure by fatigue than conventional metallic connections.

Although it may in many cases by advantageous to use a textile-based pliable fastening member, it should be noted that the pliable fastening member may, in embodiments, alternatively be made using other material configurations that are not fiber-based. For instance, the pliable fastening member may be formed by one or more bands, such as metal bands, that may not be combined by any textile-forming technique.

According to a second aspect of the present invention, it is provided a method of joining a blade and a strut of a vertical axis wind turbine, comprising the steps of: arranging the blade and the strut in such a way that a connection surface of the blade faces an end of the strut; and pulling the blade towards the end of the strut using a pliable fastening member until the connection surface of the blade is pressed against the end of the strut.

The steps of the methods according to various embodiments of the present invention need not necessarily be performed in any particular order, except where this is technically required.

BRIEF DESCRIPTION OF THE DRAWINGS

These and other aspects of the present invention will now be described in more detail, with reference to the appended drawings showing an example embodiment of the invention, wherein.

DETAILED DESCRIPTION OF EXAMPLE EMBODIMENTS

Figure 1:
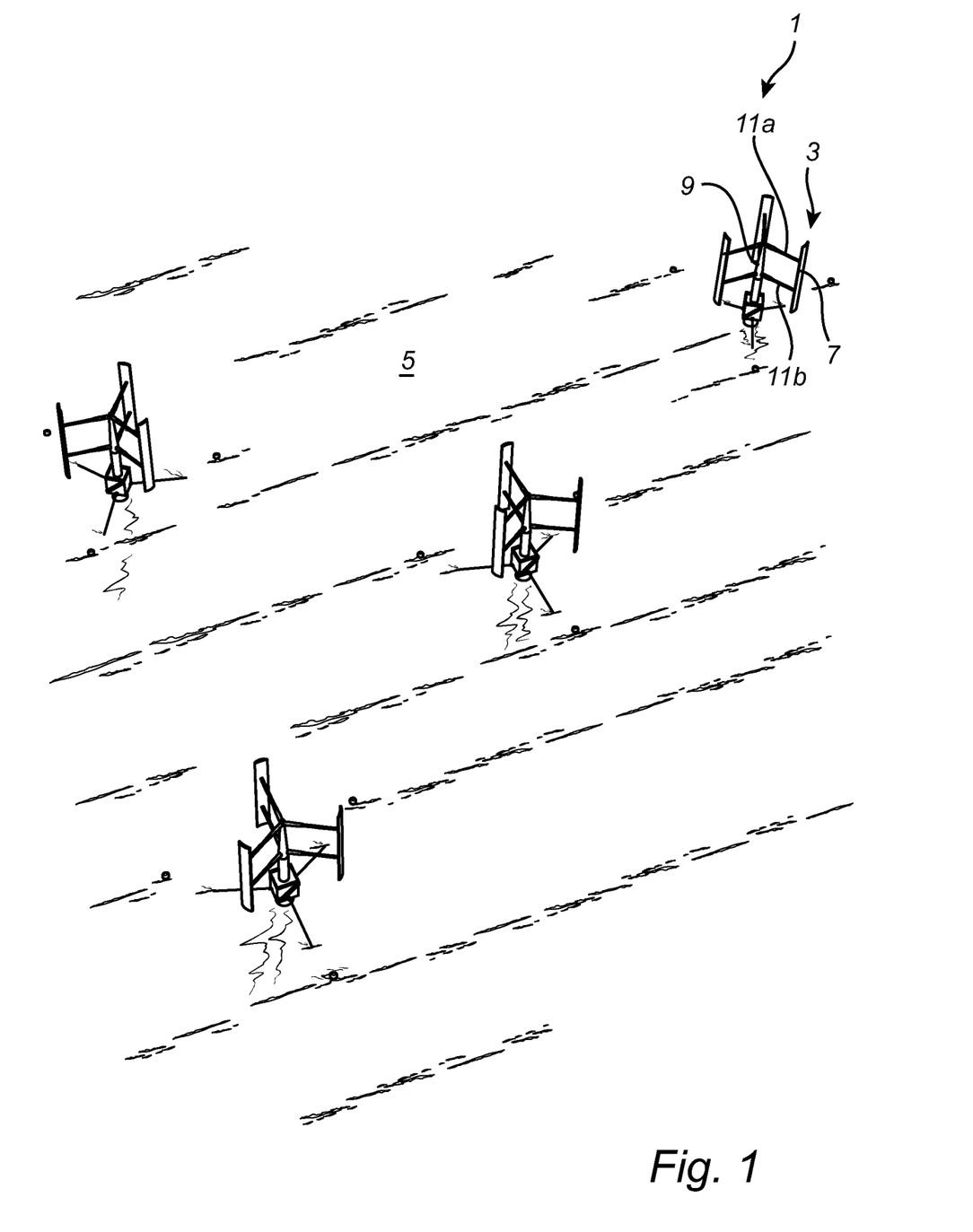
FIG. 1 is an illustration of an example of floating vertical axis wind turbines according to embodiments of the present invention arranged in an offshore wind farm.

FIG. 1 schematically shows an offshore wind farm 1 including a plurality of wind turbines 3, here in the form of vertical axle wind turbines (VAWTs) according to an example embodiment of the present invention, floating in the sea 5. These floating VAWTs 3 are shown to each have three blades 7, where each blade 7 is coupled to the wind turbine body 9 using two struts 11a-b. It should be noted that the scope of the claims is not limited to this particular type of VAWTs, but additionally encompasses, for example, land-based VAWTs, VAWTs with a smaller or larger number of blades and/or a smaller or larger number of struts per blade.

Figures 2, 3A:
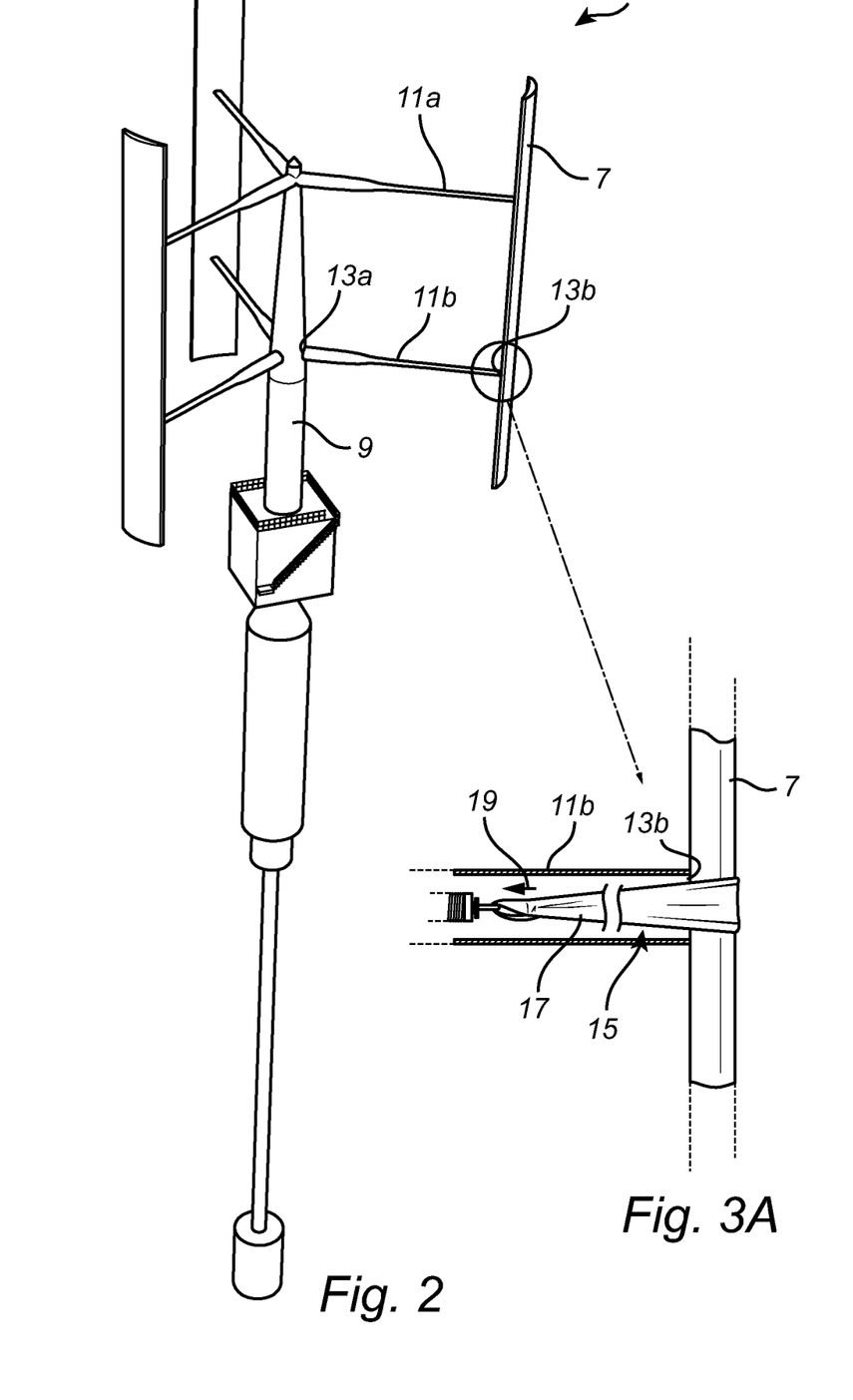
FIG. 2 is a schematic side view of one of the vertical axis wind turbines in the offshore wind farm in FIG. 1.
FIGS. 3A-B are enlarged illustrations of the connection between blade and strut in the vertical axis wind turbine in FIG. 2.

In FIG. 2, one of the VAWTs 3 in FIG. 1 is shown in a schematic side view, revealing an example configuration of the full VAWT 3, including the portion that is submerged in FIG. 1. As can be seen in FIG. 2, each of the struts 11a-b has a first end 13a coupled to the wind turbine body 9 and a second end 13b coupled to the blade 7 using a fastening arrangement (in FIG. 2, the first and second ends are only indicated by reference numerals for one of the struts 11b to avoid cluttering the drawings).

The fastening arrangement, which is not visible in FIG. 2, will be described with reference to FIGS. 3A-B, which are enlarged views of a portion of the VAWT 3 in FIG. 2, as indicated in FIG. 2.

FIG. 3A is a partial side view, in which the strut 11b is partly opened to reveal an example configuration of the above-mentioned fastening arrangement 15 that is used to couple the second end 13b of the strut 11b to the blade 7. As can be seen in FIG. 3A, the fastening arrangement comprises a pliable fastening member 17 pulling the blade 7 towards the second end 13b of the strut 11b. In the example configuration of the fastening arrangement 15 in FIG. 3A, the pliable fastening member 17 is illustrated in the form of a textile sling passing around the entire circumference of the blade 7. In embodiments where the pliable fastening member 17 is made of a textile material, it will be straightforward for the skilled person to find a suitable material that is commercially available. Known from the maritime field are, for example, various kinds of polyester, such as UHMwPE, and Kevlar, etc.

In FIG. 3A, it is indicated by arrow 19 that a pulling force is acting on the pliable fastening member 17, so that the pliable fastening member 17 in turn pulls the blade 7 towards the second end 13b of the strut 11b. The contact forces at the contact interface between the blade 7 and the second end 13b of the strut 11b will give rise to friction forces.

In embodiments, the fastening arrangement 15, including the configuration of the contact interface, may be configured to provide sufficient friction to prevent relative movement between the blade 7 and the second end 13b of the strut 11b, even when various forces may act together to reduce the contact forces at the contact interface. Such forces may include the centrifugal force, wind force, and a component of the gravitational force acting on the blade 7, especially when wind and/or waves cause the VAWT 3 to deviate from a vertical orientation of the wind turbine body 9.

Through the use of a pliable fastening member 17, the substantial force required to prevent relative movement between the blade 7 and the strut 11b can be made to act on a relatively large area, reducing the stress on the blade 7 and/or strut 11b as compared to conventional bolted connections. Furthermore, a pliable fastening member 17 can be made considerably more resilient to fatigue than rigid connections.

The pulling force represented by the arrow 19 in FIG. 3A may be provided by a tensioning arrangement. An example configuration of such a tensioning arrangement will be described below with reference to FIG. 3B.

Figure 3B:
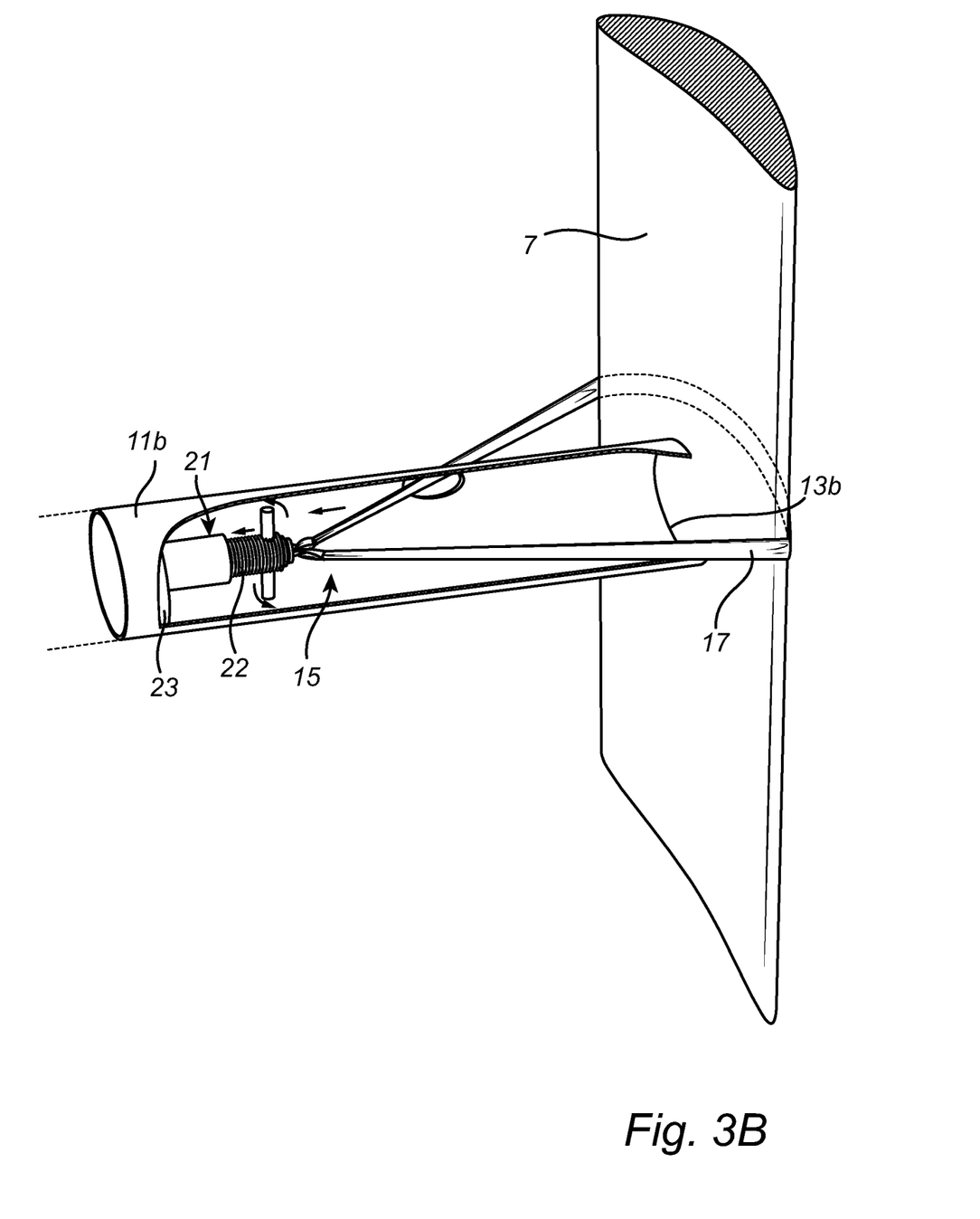

As is indicated in FIG. 3B, a tensioning arrangement 21 is provided for tensioning the pliable fastening member 17. The tensioning arrangement 21 is shown in FIG. 3B as being attached to the strut 11b at a position 23 spaced apart from the second end 13b of the strut 11b, to allow the tensioning arrangement 21 to provide the above-mentioned pulling force to the pliable fastening member 17.

In the example configuration of FIG. 3B, the tensioning arrangement 21 for tensioning the pliable fastening member 17 comprises a tensioning actuator 22 in the form of a screw. Various suitable screws are, per se, known, including roller screws, ball screws, lead screws etc. It should, however, be noted that other kinds of tensioning actuators may be beneficial depending on the requirements of the particular installation. Examples of such other kinds of tensioning actuators include a hydraulic cylinder, a spring, a bolt, etc. It should also be noted that the tensioning arrangement 21 could alternatively be arranged in or on the blade 7.

Figure 4:
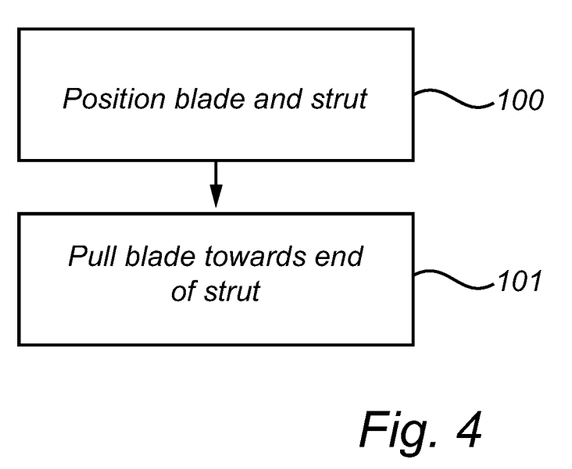
FIG. 4 is a flow-chart schematically illustrating an example embodiment of the method according to the present invention.
Figure 5A:
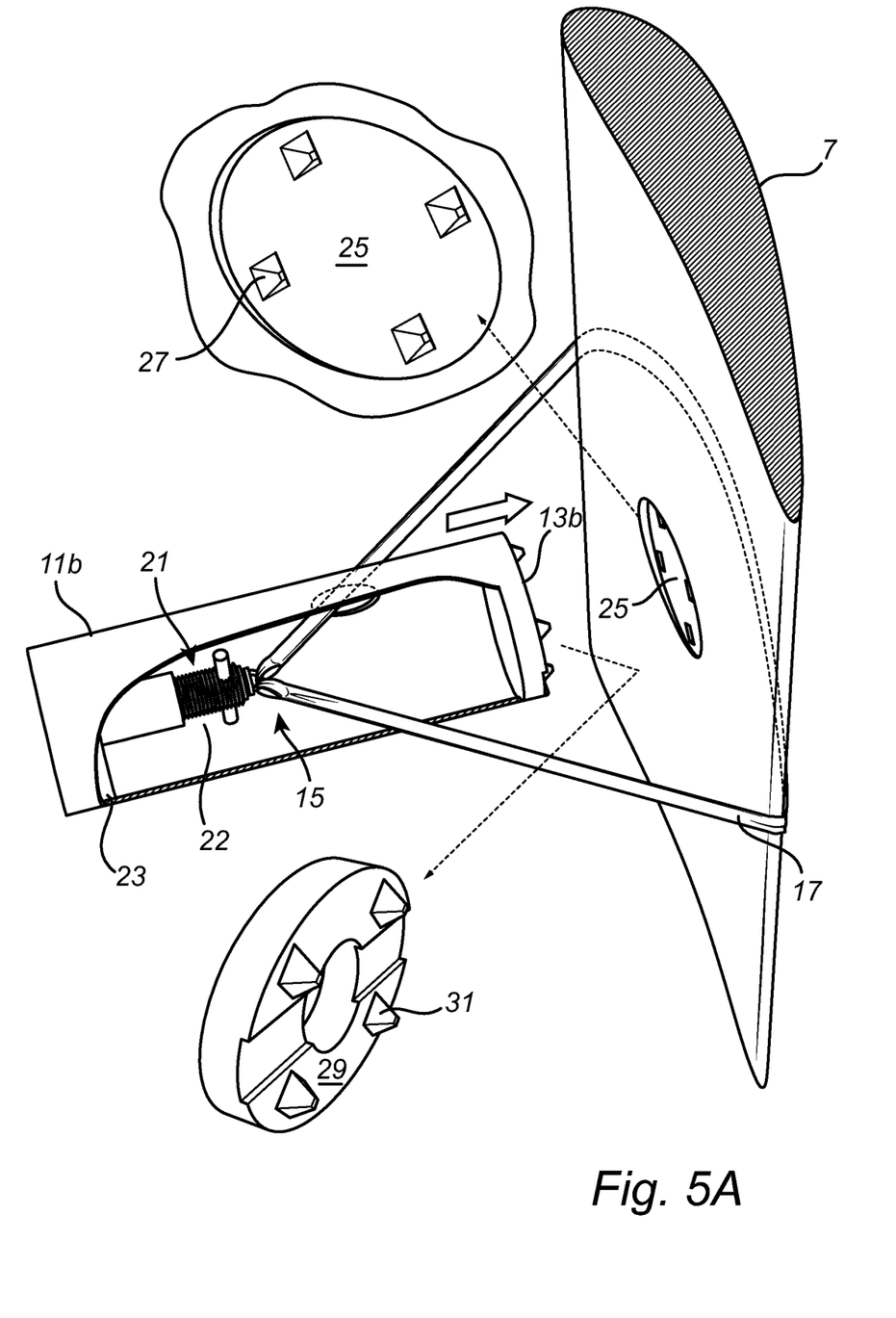
FIGS. 5A-B are schematic illustrations of different steps in the flow-chart in FIG. 4.
Figure 5B:
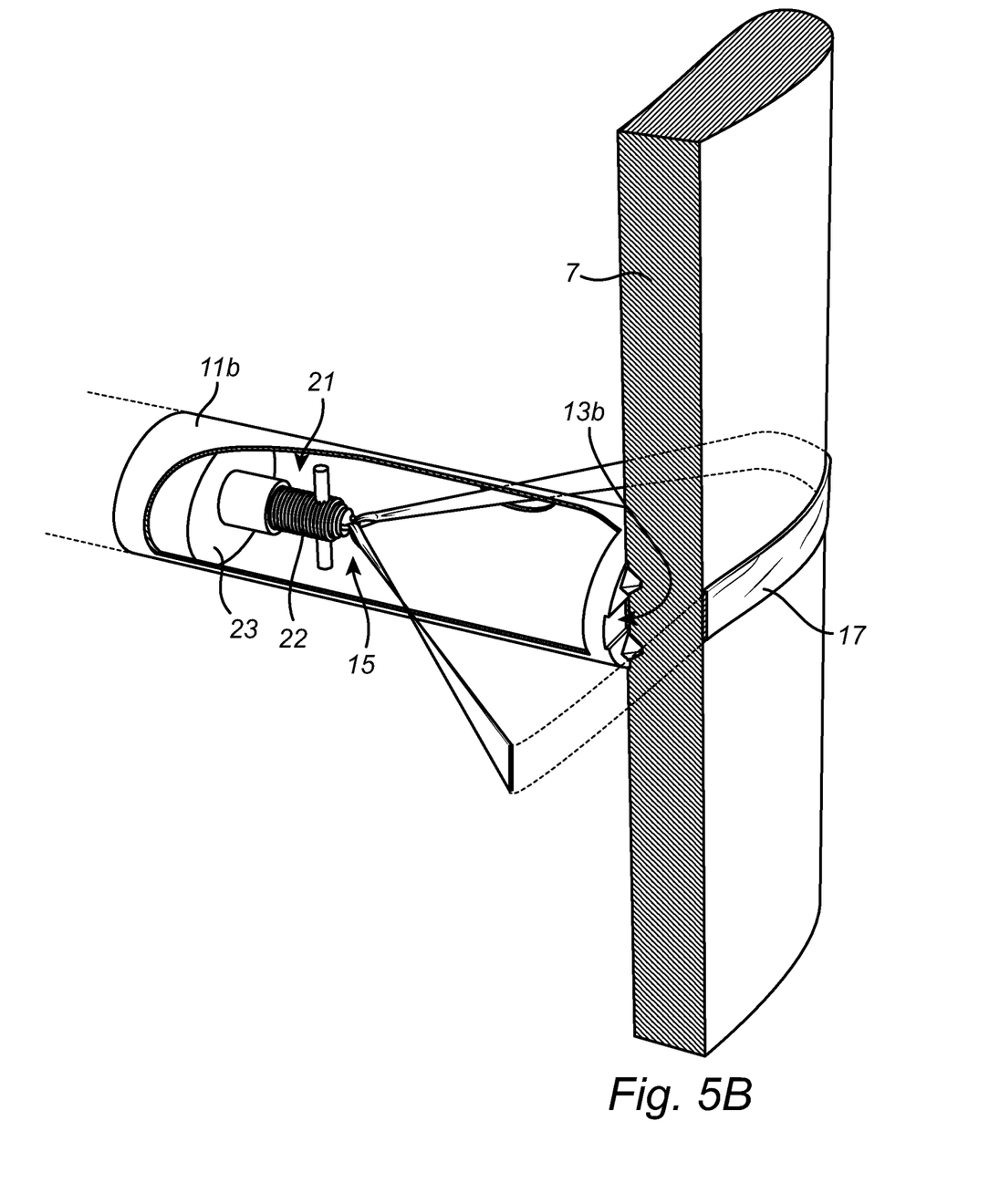

FIG. 4 is a flow-chart schematically illustrating an example embodiment of the method according to the present invention of joining a blade and a strut of a VAWT. FIGS. 5A-B are schematic illustrations of different steps in the flow-chart in FIG. 4.

Referring to FIG. 4 and FIG. 5A, the blade 7 and the strut 11b are arranged, in step 100, in such a way that a joining surface 25 of the blade 7 faces an end 13b of the strut 11b. As is schematically indicated in FIG. 5A, the VAWT 3 may be provided with a positioning structure configured to define a relative positional arrangement of the blade 7 and the end 13b of the strut 11b. In the example configuration in FIG. 5A, the positioning structure is indicated as an area 25 with a number of recesses 27 (only one indicated by a reference numeral in FIG. 5A) comprised in the blade 7, and an area 29 with complementary protrusions 31 at the end 13b of the strut 11b. The provision of the positioning structure may facilitate relative positioning of the blade 7 and the strut 11b, and may also assist in maintaining the desired relative positioning while applying tension to the pliable fastening member 17, as will be described below with reference to FIG. 5B.

As will be immediately obvious to the skilled person, many different configurations of the positioning structure will be possible, and may be beneficial depending on various circumstances, such as the material of the blade 7 and/or strut 11b and the method used for manufacturing the blade 7 and/or strut 11b. One example of an alternative configuration could be a guiding pin attached to one of the blade 7 and the strut 11b and a corresponding hole arranged to accommodate the guiding pin formed in the other one of the blade 7 and the strut 11b.

In FIG. 5A, the pliable fastening member 17 is indicated as surrounding the blade 7. Depending on the assembly facilities, and the size of the VAWT 3, etc, the pliable fastening member 17 may be installed before or after the positioning of the blade 7 and the strut 11b in relation to each other. According to one approach, the blade 7 and the strut 11b may first be arranged adjacent to each other, as shown in FIG. 5A, and then the pliable fastening member 17 may be pulled around the blade 7 before coupling both ends of the pliable fastening member 17 to the tensioning arrangement 21. According to another approach, the pliable fastening member 17 may first be coupled to the tensioning arrangement 21, and then the blade 7 may be inserted in the loop formed by the pliable fastening member 17, or the loop may be moved along the length of the blade 7 to the correct relative position of blade 7 and strut 11b.

After having arranged the blade 7 and the strut 11b in relation to each other and having passed the pliable fastening member 17 around at least a portion of the blade 7, regardless of how this is done, the blade 7 is then pulled, in step 101 towards the end 13b of the strut 11b until the joining surface 25 of the blade 7 is pressed against the end 13b of the strut 11b, by operating the tensioning arrangement 21. The tensioning arrangement 21 may be operated until the pliable fastening member 17 has been subjected to a predefined tensile force. This predefined tensile force may, for example, be determined using simulation, and may be selected to ensure none or limited relative movement between the blade 7 and the strut 11b, at the contact interface, when the VAWT 3 is in operation.

So far, embodiments of the VAWT 3 according to the present invention have been shown and described where the pliable fastening member 17 passes around the periphery of the blade 7. There are, however, many other ways to arrange the pliable fastening member 17 so that it can pull the blade 7 towards the end 13b of the strut 11b. Some of these other ways will be described below with reference to FIGS. 6A-C.

Figure 6A:
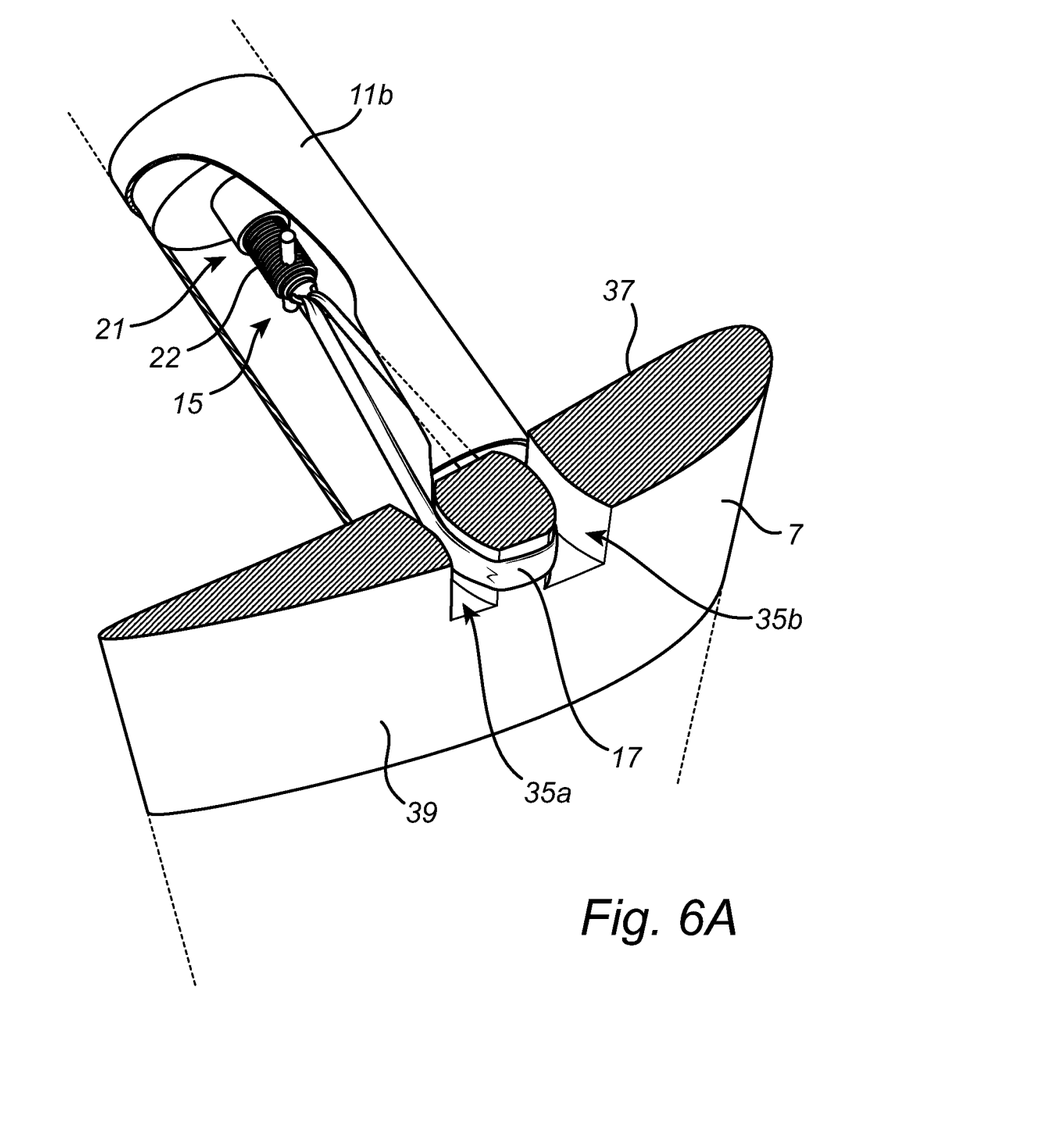
FIGS. 6A-C schematically show additional example configurations of the connection between blade and strut.

Turning first to FIG. 6A, the blade 7 is shown to comprise internal passages 35a-b accommodating the pliable fastening member 17. In the example configuration of FIG. 6A, the internal passages 35a-b pass through the blade 7 from the proximal side 37 of the blade 7 facing the wind turbine body 9 (see FIG. 2) to the distal side 39 of the blade 7 facing away from the wind turbine body 9.

Figure 6B:
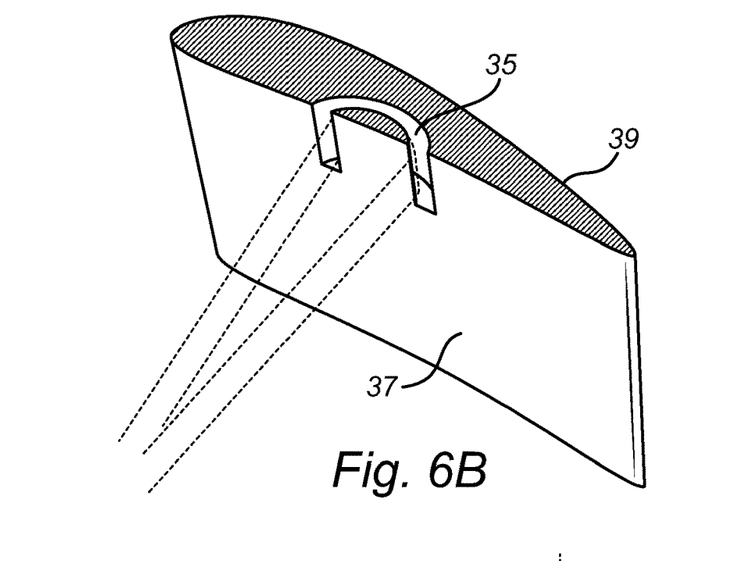

According to another example configuration, which is schematically shown in FIG. 6B, the blade 7 comprises an internal passage 35 with both openings towards the proximal side 37 of the blade 7.

Figure 6C:
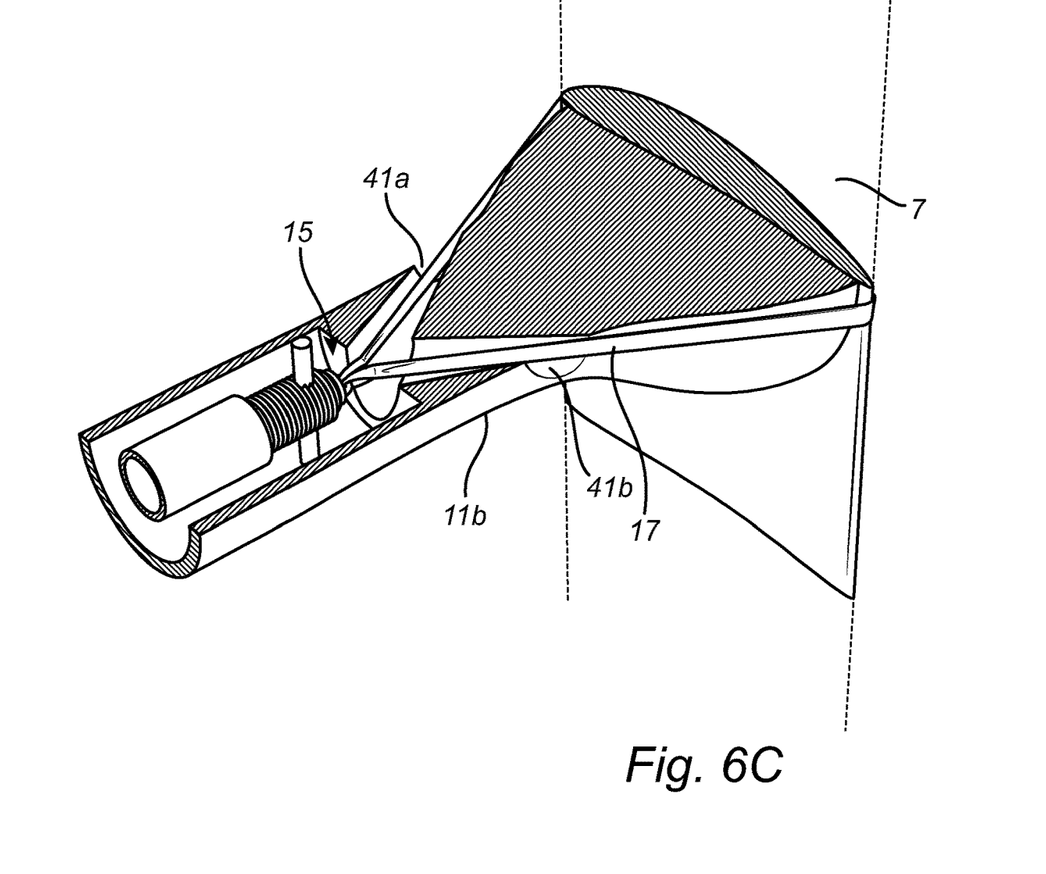

According to yet another example configuration, an end portion of the strut 11b may be provided with side-facing openings 41a-b for the pliable fastening member 17.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

The invention claimed is:

1. A vertical axis wind turbine, comprising:
a wind turbine body;
a blade; and
a strut having a first end coupled to the wind turbine body and a second end coupled to the blade using a fastening arrangement,
wherein the fastening arrangement comprises a pliable fastening member pulling the blade towards the second end of the strut with a force pressing the blade against the second end of the strut,
wherein the pliable fastening member passes around at least a portion of the blade,
wherein the fastening arrangement comprises a tensioning arrangement tensioning the pliable fastening member, and
wherein the tensioning arrangement is attached to the strut at a position along the strut spaced apart from the second end of the strut.

2. The vertical axis wind turbine according to claim 1, wherein the blade comprises an internal passage accommodating the pliable fastening member.

3. The vertical axis wind turbine according to claim 1, wherein the pliable fastening member is at least partly made of textile material.

4. The vertical axis wind turbine according to claim 1, wherein the pliable fastening member comprises at least one sling.

5. The vertical axis wind turbine according to claim 1, wherein the tensioning arrangement comprises a tensioning actuator.

6. The vertical axis wind turbine according to claim 1, further comprising a positioning structure configured to define a relative arrangement of the blade and the second end of the strut.

7. The vertical axis wind turbine according to claim 6, wherein the positioning structure comprises at least one recess in one of the blade and the second end of the strut, and at least one protrusion in the other one of the blade and the second end of the strut, the at least one protrusion being configured to interact with the at least one recess to restrict relative movement between the second end of the strut and the blade.

8. A method of joining a blade and a strut of a vertical axis wind turbine, comprising the steps of:
passing a pliable fastening member around at least a portion of the blade;
arranging the blade and the strut in such a way that a joining surface of the blade faces an end of the strut; and
pulling the blade towards the end of the strut using the pliable fastening member until the joining surface of the blade is pressed against the end of the strut,
wherein:
the strut includes a tensioning arrangement attached to the strut at a position along the strut spaced apart from the second end of the strut; and
the step of pulling comprises the steps of:
coupling the pliable fastening member to the tensioning arrangement; and
operating the tensioning arrangement until the pliable fastening member has been subjected to a predefined tensile force.

* * * * *